(12) United States Patent
Kim et al.

(10) Patent No.: US 8,295,780 B2
(45) Date of Patent: Oct. 23, 2012

(54) METHOD FOR APPLYING AMPLITUDE USE TO DIGITAL AMPLYFIER WITH VARIABLE BIT RESOLUTION OR CLOCK FREQUENCY AND APPARATUS FOR EXCUTING THE METHOD

(75) Inventors: Kyeong-pyo Kim, Daejeon (KR); Woo Yong Lee, Daejeon (KR); Jin Kyeong Kim, Daejeon (KR); Yong Sun Kim, Daejeon (KR); Hyoung Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 422 days.

(21) Appl. No.: 12/675,452

(22) PCT Filed: Aug. 1, 2008

(86) PCT No.: PCT/KR2008/004480
§ 371 (c)(1),
(2), (4) Date: Feb. 26, 2010

(87) PCT Pub. No.: WO2009/028806
PCT Pub. Date: Mar. 5, 2009

(65) Prior Publication Data
US 2010/0233967 A1 Sep. 16, 2010

(30) Foreign Application Priority Data

Aug. 28, 2007 (KR) .................. 10-2007-0086772
Apr. 29, 2008 (KR) .................. 10-2008-0040105

(51) Int. Cl.
*H04B 1/00* (2006.01)
*H04B 7/00* (2006.01)
(52) U.S. Cl. .................. 455/69; 455/67.11; 455/67.13; 455/68; 455/70; 455/522; 455/102; 455/226.1; 455/226.3; 375/267; 375/358; 375/371; 375/376; 370/252; 370/318; 370/464; 370/465

(58) Field of Classification Search .............. 455/67.11, 455/67.13, 68–70, 522, 561, 91, 101–102, 455/226.1–226.3; 375/232, 260, 267–269, 375/356, 358, 371, 373, 374, 375, 376; 370/252, 370/318, 464–465
See application file for complete search history.

(56) References Cited

U.S. PATENT DOCUMENTS
6,804,211 B1    10/2004 Klein et al.
(Continued)

FOREIGN PATENT DOCUMENTS
KR    1020050108509 A    11/2005

OTHER PUBLICATIONS
International Search Report: PCT/KR2008/004480.

*Primary Examiner* — Tuan A Tran
(74) *Attorney, Agent, or Firm* — Ladas & Parry LLP

(57) ABSTRACT

Disclosed is an adaptive modulation scheme and apparatus thereof using an Analog/Digital (AJO) converter with variable bit resolution or clock frequency, the A/D converter including a transmitter including a modulator to modulate data to be transmitted according to a modulation scheme received from a receiver, an A/D converter to convert the modulated data into an analog signal using a bit resolution or a clock frequency received from the receiver, and a radio frequency (RF) processor to transmit the analog signal to the receiver through a wireless channel and a receiver including an RF processor to receive data through a wireless channel, a calculator to calculate a Signal to Noise Ratio (SNR) of the data received through the RF processor, and a modulation controller to search a predetermined setting table for a corresponding modulation scheme and bit resolution using the calculated SNR and to transmit to a transmitter.

13 Claims, 3 Drawing Sheets

U.S. PATENT DOCUMENTS

| | | | |
|---|---|---|---|
| 6,941,153 B2 * | 9/2005 | Kim et al. | 455/522 |
| 7,421,039 B2 * | 9/2008 | Malaender et al. | 375/304 |
| 7,453,947 B2 * | 11/2008 | Kim et al. | 375/267 |
| 7,525,988 B2 * | 4/2009 | Kim | 370/465 |
| 7,593,697 B2 * | 9/2009 | Zhu et al. | 455/102 |
| 7,787,555 B2 * | 8/2010 | Kim et al. | 375/267 |
| 7,830,977 B2 * | 11/2010 | Li et al. | 375/267 |
| 7,839,819 B2 * | 11/2010 | Kim | 370/329 |
| 7,924,943 B2 * | 4/2011 | Kim et al. | 375/299 |
| 7,933,560 B2 * | 4/2011 | Han et al. | 455/69 |
| 8,086,242 B2 * | 12/2011 | Kent et al. | 455/452.2 |
| 2002/0118845 A1 | 8/2002 | Henn et al. | |
| 2004/0141566 A1 * | 7/2004 | Kim et al. | 375/267 |
| 2005/0135507 A1 | 6/2005 | Chang et al. | |
| 2007/0099648 A1 * | 5/2007 | Kim et al. | 455/522 |
| 2008/0107193 A1 * | 5/2008 | Erceg et al. | 375/260 |
| 2008/0146215 A1 * | 6/2008 | Oota | 455/422.1 |
| 2008/0318606 A1 * | 12/2008 | Tsutsui et al. | 455/500 |
| 2009/0316802 A1 * | 12/2009 | Tong et al. | 375/260 |
| 2010/0008440 A1 * | 1/2010 | Lin et al. | 375/267 |
| 2010/0254474 A1 * | 10/2010 | Gomadam et al. | 375/267 |
| 2010/0278225 A1 * | 11/2010 | Chun et al. | 375/224 |

* cited by examiner

METHOD FOR APPLYING AMPLITUDE USE TO DIGITAL AMPLYFIER WITH VARIABLE BIT RESOLUTION OR CLOCK FREQUENCY AND APPARATUS FOR EXCUTING THE METHOD

TECHNICAL FIELD

The present invention relates to an adaptive modulation apparatus using an Analog/Digital (A/D) converter with variable clock frequency or variable bit resolution in a Wireless Personal Area Network (WPAN) communication system and a method thereof, and particularly, to a method and apparatus of changing bit resolution, a clock frequency, and a modulation scheme according to the state of a wireless transmission channel, thereby ensuring effective utilization of resources of a system and a maximum transmission rate without data error in a given channel state.

This work was supported by the IT R&D program of MIC/IITA. [2007-S-002-01, Development of Multi-Gigabit Wireless Interface Technologies]

BACKGROUND ART

Conventionally, an adaptive modulation/demodulation scheme that can change a digital modulation scheme by transmitting channel state information to a transmitter based on a signal received from a receiver of a high-speed Wireless Personal Area Network (WPAN) communication system is widely used. This method can ensure a maximum transmission rate without data error. In terms of hardware embodiment, the method can adaptively change the digital modulation scheme to optimize a calculation complexity of the receiver, and thereby can reduce power consumption to an extent. However, the method is a long way from an adaptive modulation and demodulation in associated with a active power resource management.

The adaptive modulation is known as one of various technologies that supports a high-speed wireless communication. A basic concept of the adaptive modulation is to change a modulation scheme according to a channel state, and basically to use a time-varying feature of a fading wireless channel instead of to avoid fading in the wireless channel.

Meanwhile, the bit resolution is a scale that indicates how close a converted digital signal is to an original signal, namely, an analog signal, when the A/D converter converts the analog signal into the digital signal. That is, as the bit resolution is higher, the signal converted into the digital signal gets closer to the original analog signal, and as the bit resolution is lower, a quantization error value between the signal converted into the digital signal and the original analog signal gets greater. As the quantization error value is greater, a digital signal processing result may provide inaccurate results, and thus performance of the receiver decrease.

In other words, generally, as the bit resolution is higher, a rate that the A/D converter can handle may decrease. Also, since as the bit resolution increase, power consumption increase relative to the increase of resolution and a digital signal output value becomes fine, there may be a problem that a digital circuit becomes complex.

However, as the bit resolution is higher, the digital signal output value becomes more accurate, thereby increasing accuracy of a circuit output value and improving performance.

A high-speed WPAN system is one of various technologies that can change digital media to a wireless form. For example, due to requirements of a high-speed transmission, such as communication from a notebook computer to a beam projector, communication from a set top box to a high-quality television, and the like, communication that is only possible with a wired cable is currently considered to be used with wireless communication. Specifically, Institute of Electrical and Electronics Engineers (IEEE) 802.15 WPAN, which is the International Standardization Organization for utilization as described above, has an affiliated organization, TG3c. TG3c has determined a carrier frequency for the wireless communication as 60 GHz. This is the reason the WPAN system for the utilization is referred to as a millimeter-wave WPAN system, and there are efforts for standardization of the system. However, there are a lot of difficult problems in the WPAN system based on the millimeter-wave. For example, in the case of a Radio Frequency (RF) technology of a millimeter-wave frequency band, it is considered one of the most difficult problems in millimeter-wave based WPAN system technologies, since the RF technology is required to be embodied based on an RF technology using complementary metal-oxide-semiconductor (CMOS) to embody an inexpensive RF device or an RF technology which is comparable with the CMOS in view of price. Due to international interest with respect to an RF-CMOS technology in a millimeter-wave frequency band, the technology of today can embody an RF technology based on CMOS technology in a 60 GHz frequency band. Also, an RF-CMOS is nearly commercialized. Another difficult problem in the WPAN system of a millimeter-wave frequency band is embodiment of an A/D converter that supports a transmission rate of several gigabits. That is, a minimum required transmission rate of a High-Definition Multimedia Interface (HDMI) that IEEE 802.15.3c considers is 2.5 Gbps, the HDMI being a utilization of the WPAN based on the millimeter-wave. In this instance, to process the transmission rate of 2.5 Gbps in a digital communication, the A/D converter is required to perform sampling data at a rate of at least 5 Gbps in view of Niquist. Considering an A/D converter technology of today, it may a heavy burden. For example, an A/D converter that supports five to six bits per sample is generally used, to ensure reasonable performance requirement. Supporting HDMI of 2.5 Gbps is inappropriate for the WPAN system, since the A/D converter technology of today consumes a great amount of power to support five to six bits at a rate of 5 Gbps.

DISCLOSURE OF INVENTION

Technical Goals

An aspect of the present invention provides an adaptive modulation scheme using an Analog/Digital (A/D) converter with variable bit resolution or clock frequency and an apparatus thereof.

Another aspect of the present invention also provides a method and apparatus of changing bit resolution and a modulation scheme according to the state of a wireless transmission channel, thereby ensuring effective utilization of resources of a system and a maximum transmission rate without data error in a given channel state.

Another aspect of the present invention also provides a method and apparatus of changing a clock frequency and a modulation scheme according to the state of a wireless transmission channel, thereby ensuring effective utilization of resources of a system and a maximum transmission rate without data error in a given channel state.

Technical Solutions

According to an aspect of an exemplary embodiment, there is provided a transmitter of a wireless communication system including a modulator to modulate data to be transmitted according to a modulation scheme received from a receiver, an analog to digital (A/D) converter to convert the modulated data into an analog signal using a bit resolution or a clock frequency received from the receiver, and a radio frequency (RF) processor to transmit the analog signal to the receiver through a wireless channel.

According to another aspect of an exemplary embodiment, there is provided a receiver of a wireless communication system including an RF processor to receive data through a wireless channel, a calculator to calculate a Signal to Noise Ratio (SNR) of the data received through the RF processor, and a modulation controller to search a predetermined setting table for a corresponding modulation scheme and bit resolution using the calculated SNR and to transmit to a transmitter.

According to yet another aspect of an exemplary embodiment, there is provided a method for transmitting data from a transmitter in a wireless communication system including modulating data to be transmitted according to a modulation scheme received from a receiver, converting the modulated data into an analog signal using bit resolution or a clock frequency received from the receiver, and transmitting the analog signal to the receiver through a wireless channel.

According to still another aspect of an exemplary embodiment, there is provided a method for receiving data in a receiver of a wireless communication system including receiving analog data through a wireless channel, calculating an SNR of the received data, searching a predetermined setting table for a corresponding modulation scheme and bit resolution using the calculated SNR, transmitting the retrieved modulation scheme and bit resolution to a transmitter, and setting the bit resolution as a bit resolution for digital converting of subsequent data to be received.

According to another aspect of an exemplary embodiment, there is provided a method for receiving data in a receiver of a wireless communication system including receiving analog data through a wireless channel, calculating an SNR of the received data, searching a predetermined setting table for a corresponding modulation scheme and clock frequency using the calculated SNR, transmitting the retrieved modulation scheme and clock frequency to a transmitter, and setting the clock frequency as a clock frequency for digital converting of subsequent data to be received.

Advantageous Effects

The present invention relates to an adaptive modulation scheme and apparatus thereof using an A/D converter with variable bit resolution and clock frequency, the A/D converter including a transmitter including a modulator to modulate data to be transmitted according to a modulation scheme received from a receiver, an A/D converter to convert the modulated data into an analog signal using a bit resolution or a clock frequency received from the receiver, and an RF processor to transmit the analog signal to the receiver through a wireless channel and a receiver including an RF processor to receive data through a wireless channel, a calculator to calculate an SNR of the data received through the RF processor, and a modulation controller to search a predetermined setting table for a corresponding modulation scheme and bit resolution using the calculated SNR and to transmit to a transmitter. Particularly, the present invention adaptively controls the bit resolution or clock frequency of the A/D converter that is one of various parts that consume the greatest amount of power when the wireless communication system is embodied in hardware, and thereby can effectively manage power resources.

BEST MODE FOR CARRYING OUT THE INVENTION

Figure 1:
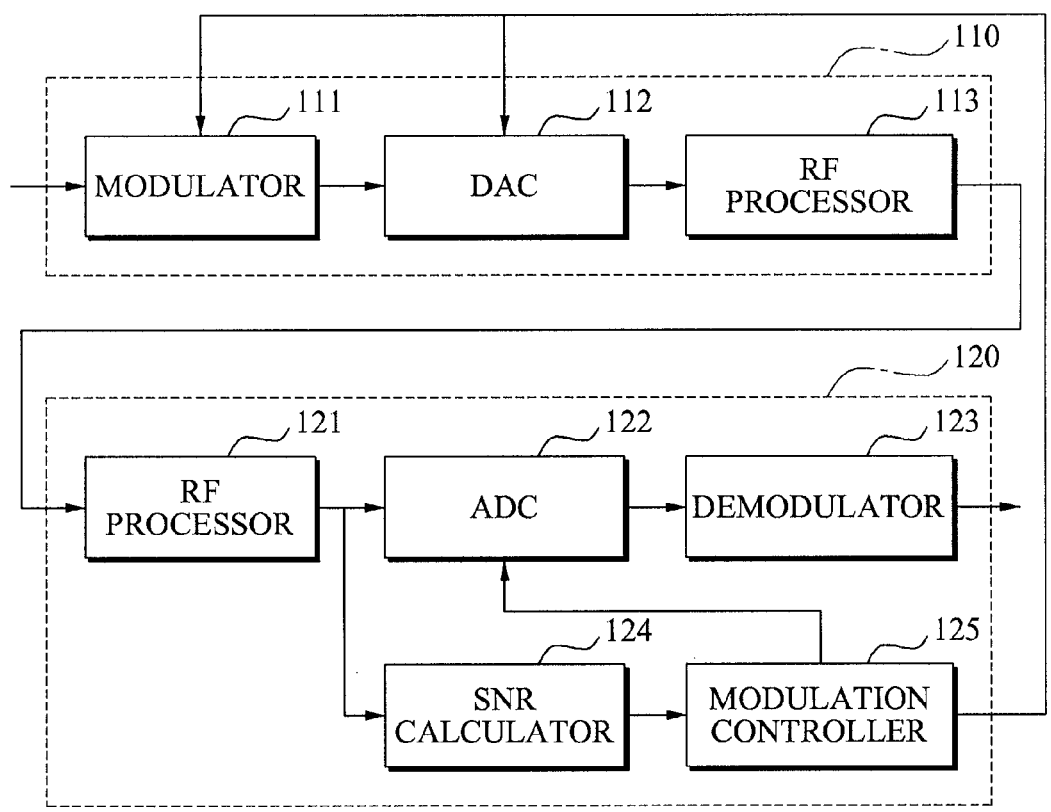
FIG. 1 illustrates a structure of a wireless communication system having an adaptive modulation apparatus with a variable clock frequency or a variable bit resolution according to an exemplary embodiment of the present invention.

Although a few exemplary embodiments of the present invention have been shown and described, the present invention is not limited to the described exemplary embodiments, wherein like reference numerals refer to the like elements throughout.

The present invention relates to an adaptive modulation apparatus using an analog to digital (A/D) converter with variable clock frequency or variable bit resolution in a high-speed Wireless Personal Area network (WPAN) communication system and a method thereof. Hereinafter, a format of a wireless communication system will be described below referring to FIG. 1.

FIG. 1 illustrates a structure of a wireless communication system having an adaptive modulation apparatus with a variable clock frequency or a variable bit resolution according to an exemplary embodiment of the present invention.

Referring to FIG. 1, the wireless communication system of the present invention includes a transmitter 110 and receiver 120. In this instance, the transmitter 110 includes a modulator 111, Digital/Analog (D/A) converter 112, and RF processor 113, and the receiver 120 includes an RF processor 121, A/D converter 122, demodulator 123, and Signal to Noise Ratio (SNR) calculator 124, and modulation controller 125.

First, elements of the transmitter are described as follow. Upon receiving digital data to be transmitted from an upper layer, a modulator modulates the digital data using a predetermined digital modulation scheme or a modulation scheme feedbacked from the receiver 120, and provide the modulated signal to the D/A converter 112.

The D/A converter 112 converts the modulated signal into an analog signal through a digital filtering using bit resolution feedbacked from a receiver 120 or predetermined bit resolution, and provides the converted signal to the RF processor 113. Also, the D/A converter 112 may convert the modulated signal into the analog signal using a clock frequency instead of using the bit resolution. In this instance, the D/A converter 112 performs oversampling the digital signal with a corresponding clock frequency using a clock frequency feedbacked from the receiver 120 or a predetermined clock frequency, converts the signal into the analog signal through a digital filtering, and provides the converted signal to the RF processor 113.

The RF processor 113 includes a filter and front end unit, and the like. Also, the RF processor 113 receives a signal of a high frequency band, which passes through a wireless channel, to convert into a baseband signal, and outputs the converted signal.

The A/D converter 122 converts the analog baseband signal of the RF processor 121 into a digital signal using bit resolution set by the modulation controller 125 or clock frequency and outputs the converted signal.

The modulator 123 receives the digital signal converted through the A/D converter 122, demodulates the signal using a digital modulation scheme used when the transmitter 100 transmits a signal, and transmits the demodulated signal to the upper layer.

The SNR calculator 124 calculates a signal to noise ratio (SNR) of an analog signal received through the RF processor 121 and provide the calculated value to the modulation controller 125.

The modulation controller 125 searches a setting table predetermined by an experiment for a modulation scheme and bit resolution corresponding to the SNR using the SNR provided from the SNR calculator 124. In this instance, the modulation controller 125 may search for a clock frequency instead of bit resolution. Subsequently, the modulation controller 125 performs feedback of the set modulation scheme to the modulator 111 of the receiver 110 and provides set bit resolution or clock frequency to the D/A converter of the receiver 110 and to the A/D converter 122 of the transmitter 120.

Example of a setting table used when searching for the modulation scheme and bit resolution corresponding to the SNR may be expressed as shown in Table 1.

TABLE 1

| Index | SNR | Modulation | Bit Resolution |
|---|---|---|---|
| 0-A | SNR < TH_1 | ERROR | ERROR |
| 1-A | TH_1 =< SNR < TH_1 + K | BPSK | 6 BITS |
| 1-B | TH_1 + K =< SNR < TH_1 + 2 * K | BPSK | 5 BITS |
| 1-C | TH_1 + 2 * K =< SNR < TH_1 + 3 * K | BPSK | 4 BITS |
| 1-D | TH_1 + 3 * K =< SNR < TH_1 + 4 * K | BPSK | 3 BITS |
| 1-E | TH_1 + 4 * K =< SNR < TH_1 + 5 * K | BPSK | 2 BITS |
| 1-F | TH_1 + 5 * K =< SNR < TH_1 + 6 * K | BPSK | 1 BITS |
| 2-A | TH_2 =< SNR < TH_2 + K | QPSK | 6 BITS |
| 2-B | TH_2 + K =< SNR < TH_2 + 2 * K | QPSK | 5 BITS |
| 2-C | TH_2 + 2 * K =< SNR < TH_2 + 3 * K | QPSK | 4 BITS |
| 2-D | TH_2 + 3 * K =< SNR < TH_2 + 4 * K | QPSK | 3 BITS |
| 2-E | TH_2 + 4 * K =< SNR < TH_2 + 5 * K | QPSK | 2 BITS |
| 2-F | TH_2 + 5 * K =< SNR < TH_2 + 6 * K | QPSK | 1 BITS |
| 3-A | TH_3 =< SNR < TH_3 + K | 8QAM | 6 BITS |
| 3-B | TH_3 + K =< SNR < TH_3 + 2 * K | 8QAM | 5 BITS |
| 3-C | TH_3 + 2 * K =< SNR < TH_3 + 3 * K | 8QAM | 4 BITS |
| 3-D | TH_3 + 3 * K =< SNR < TH_3 + 4 * K | 8QAM | 3 BITS |
| 3-E | TH_3 + 4 * K =< SNR < TH_3 + 5 * K | 8QAM | 2 BITS |
| 4-A | TH_4 =< SNR < TH_4 + K | 16QAM | 6 BITS |
| 4-B | TH_4 + K =< SNR < TH_4 + 2 * K | 16QAM | 5 BITS |
| 4-C | TH_4 + 2 * K =< SNR < TH_4 + 3 * K | 16QAM | 4 BITS |
| 4-D | TH_4 + 3 * K =< SNR < TH_4 + 4 * K | 16QAM | 3 BITS |
| 4-E | TH_4 + 4 * K =< SNR < TH_4 + 5 * K | 16QAM | 2 BITS |
| 5-A | TH_5 =< SNR < TH_5 + K | 32QAM | 6 BITS |
| 5-B | TH_5 + K =< SNR < TH_5 + 2 * K | 32QAM | 5 BITS |
| 5-C | TH_5 + 2 * K =< SNR < TH_5 + 3 * K | 32QAM | 4 BITS |
| 5-D | TH_5 + 3 * K =< SNR < TH_5 + 4 * K | 32QAM | 3 BITS |
| 6-A | TH_6 =< SNR < TH_6 + K | 64QAM | 6 BITS |
| 6-B | TH_6 + K =< SNR < TH_6 + 2 * K | 64QAM | 5 BITS |
| 6-3 | SNR >= TH_6 + 2 * K | 64QAM | 4 BITS, | where TH_1 to TH_6 are predetermined reference values to set a modulation scheme, K is a Signal to quantizing Noise Ratio. Also, when N is a positive number in the table 1, TH_N+L*K=<TH_(N+1). When TH_N+N*K>TH_(N+1) and SNR>=TH_(N+1), The modulation controller 125 proceeds with an Index (N+1)-A.

The bit resolution or clock frequency corresponding to the SNR that the modulating controller 125 sets based on the setting table has a feature that, as the SNR increase, the bit resolution decrease and as the SNR increase, the clock frequency decrease.

Hereinafter, a method of changing a clock frequency and modulation scheme according to a wireless transmission channel state in a wireless communication system according to the present invention will be described below referring to drawings.

Figure 2:
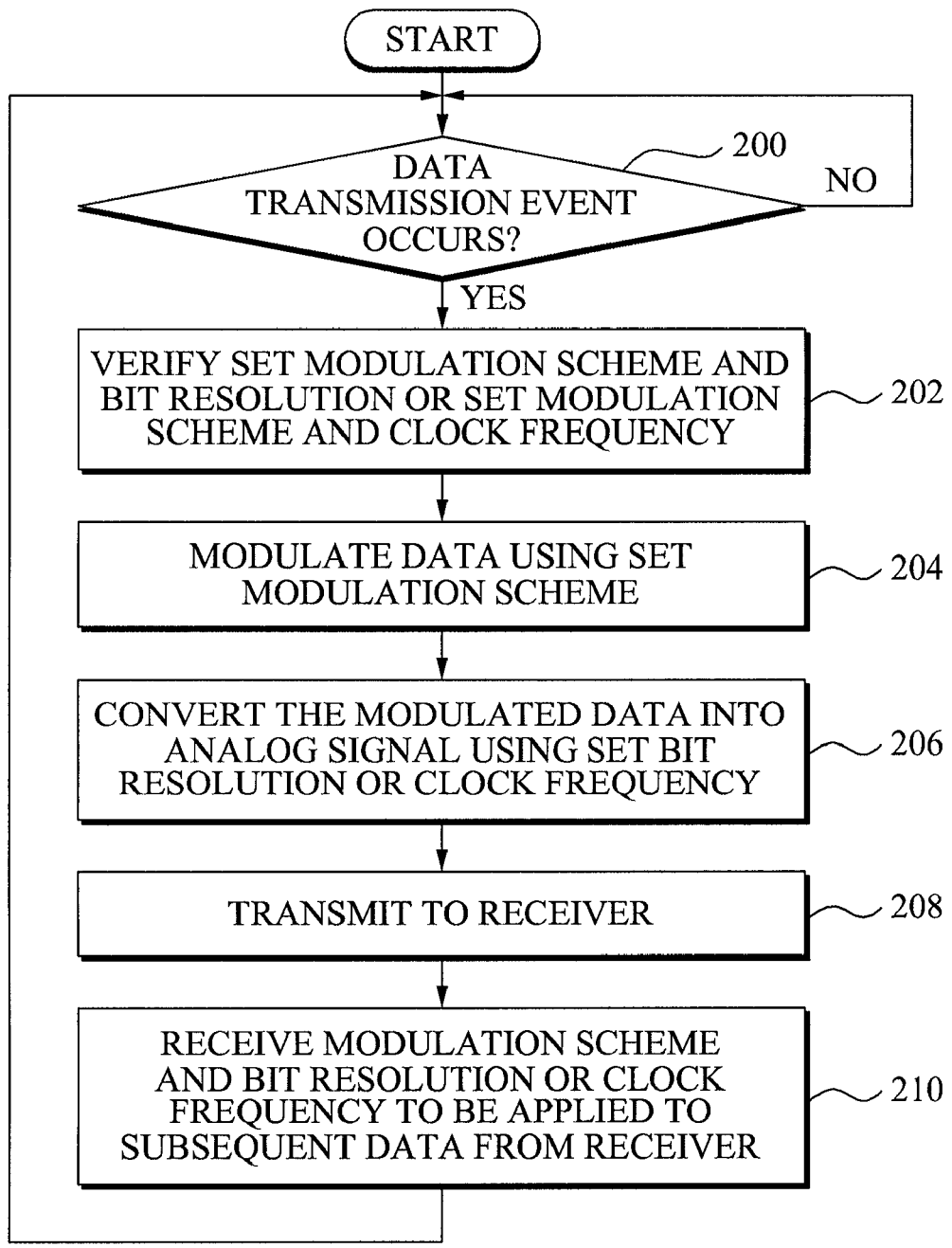
FIG. 2 is a flowchart illustrating a method of transmitting data from a transmitter of a wireless communication system according to an exemplary embodiment of the present invention.

FIG. 2 is a flowchart illustrating a method of transmitting data from a transmitter of a wireless communication system according to an exemplary embodiment of the present invention.

Referring to FIG. 2, when the transmitter of the present invention receives digital data to be transmitted from an upper layer in operation 200 and detects an occurrence of data transmission event, the transmitter proceeds with operation 202 to verify a currently set modulation scheme and bit resolution. In this instance, instead of the set bit resolution, the currently set clock frequency may be verified.

Subsequently, the transmitter proceeds with operation 204 to modulate the data according to the set modulation scheme, proceeds with operation 206 to convert the modulated data into an analog signal using the set bit resolution or clock frequency, and proceeds with operation 208 to transmit the converted signal to a receiver.

Subsequently, a modulation scheme and bit resolution to be applied to a subsequent data is received from the receiver and set. In this instance, instead of the bit resolution, the clock frequency may be received and set.

Figure 3:
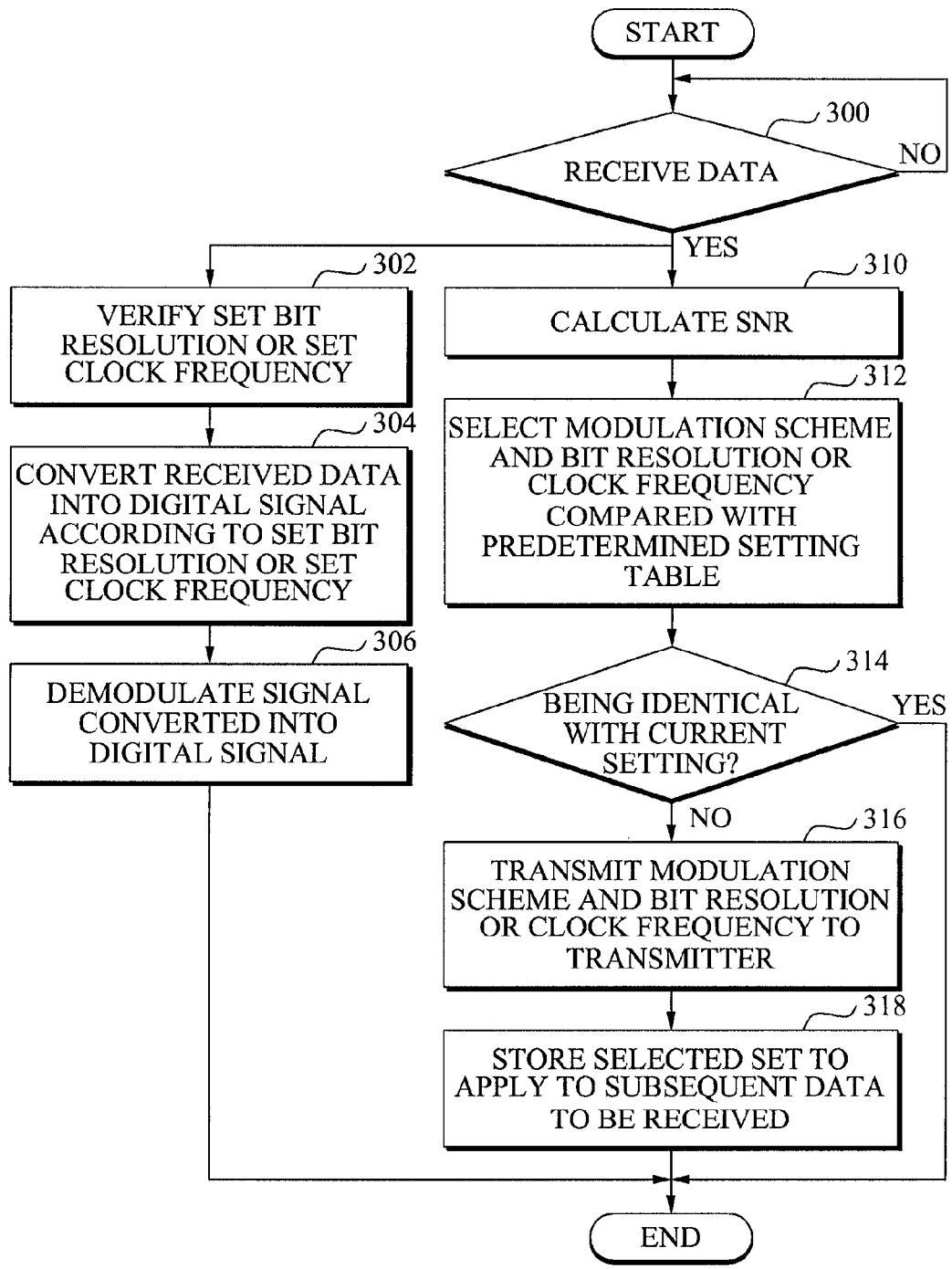
FIG. 3 is a flowchart illustrating a method of receiving data in a receiver of a wireless communication system according to an exemplary embodiment of the present invention.

FIG. 3 is a flowchart illustrating a method of receiving data in a receiver of a wireless communication system according to an exemplary embodiment of the present invention. Referring to FIG. 3, the method may be roughly classified into demodulating the received data and setting a modulation scheme and bit resolution or a clock frequency using the received data.

First, a process of the demodulating the received data is as follow. When the receiver of the present invention receives data in operation 300, the receiver proceeds with operation 302 to verify bit resolution or clock frequency that is set at the time of reception, proceeds with operation 304 to convert the received data into a digital signal according to the set bit resolution or set clock frequency, and proceeds with operation 306 to demodulate the signal converted into the digital signal.

Subsequently, a process of the setting the modulation scheme and bit resolution or the clock frequency is as follow. When the receiver of the present invention receives data in operation 300, the receiver proceeds with operation 310 to calculate an SNR of the received data, proceeds with operation 312 to search a setting table predetermined by an experiment for the modulation scheme and bit resolution corresponding to the SNR. In this instance, instead of the bit resolution, the clock frequency may be retrieved.

Subsequently, the receiver proceeds with operation 314 to identify whether a search result of the setting table is identical with the current setting and when they are not identical with each other, the receiver proceeds with operation 316 to transmit the retrieved modulation scheme and bit resolution through feedback or transmit the retrieved modulation scheme and clock frequency through feedback, and proceeds with operation 318 to provide the retrieved bit resolution or clock frequency to an A/D converter of the receiver and to set the retrieved bit resolution or clock frequency to be applied when subsequent data to be received is converted into a digital signal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmitter of a wireless communication system, comprising:
   a modulator to modulate data to be transmitted according to a modulation scheme received from a receiver;
   an analog to digital (A/D) converter to convert the modulated data into an analog signal using a bit resolution or a clock frequency received from the receiver; and
   a radio frequency (RF) processor to transmit the analog signal to the receiver through a wireless channel.

2. The transmitter of claim 1, wherein the modulation scheme, bit resolution, and clock frequency are set by the receiver using data that the transmitter previously transmits according to a channel environment of the wireless channel.

3. A receiver of a wireless communication system, comprising:
   an RF processor to receive data through a wireless channel;
   a calculator to calculate a Signal to Noise Ratio (SNR) of the data received through the RF processor; and
   a modulation controller to search a predetermined setting table for a corresponding modulation scheme and bit resolution using the calculated SNR and to transmit to a transmitter.

4. The receiver of claim 3, further comprising:
   an A/D converter to convert the currently received data into an analog signal using the retrieved bit resolution when previous data is received from the modulation controller.

5. The receiver of claim 3, wherein the setting table includes a modulation scheme and bit resolution information respectively corresponding to an SNR range.

6. The receiver of claim 3, wherein the setting table has a feature that the bit resolution decreases as the SNR increases.

7. The receiver of claim 3, wherein the modulation controller searches the predetermined setting table for a corresponding modulation scheme and clock frequency using the calculated SNR to transmit to a transmitter.

8. The receiver of claim 7, further comprising:
   an A/D converter to convert the currently received data into an analog signal using the retrieved clock frequency when previous data is received from the modulation controller.

9. The receiver of claim 7, wherein the setting table includes a modulation scheme and bit resolution information respectively corresponding to an SNR range.

10. The receiver of claim 7, wherein the setting table has a feature that the clock frequency decreases as the SNR increases.

11. A method for transmitting data from a transmitter in a wireless communication system, comprising:
    modulating data to be transmitted according to a modulation scheme received from a receiver;
    converting the modulated data into an analog signal using bit resolution or a clock frequency received from the receiver; and
    transmitting the analog signal to the receiver through a wireless channel.

12. The method of claim 11, wherein the modulation scheme, bit resolution, and clock frequency are set by the receiver using data that the transmitter previously transmits according to a channel environment of the wireless channel.

13. A method for receiving data in a receiver of a wireless communication system, comprising:
    receiving analog data through a wireless channel;
    calculating an SNR of the received data;
    searching a predetermined setting table for a corresponding modulation scheme and bit resolution using the calculated SNR;
    transmitting the retrieved modulation scheme and bit resolution to a transmitter; and
    setting the bit resolution as a bit resolution for digital converting of subsequent data to be received.

* * * * *